(12) United States Patent
Corey

(10) Patent No.: US 6,511,025 B1
(45) Date of Patent: Jan. 28, 2003

(54) GOLF BAG RETAINING DEVICE

(76) Inventor: Donald C. Corey, 3109 Douglas St., Raleigh, NC (US) 27606

(*) Notice: Subject to any disclaimer, the term of this patent is extended or adjusted under 35 U.S.C. 154(b) by 0 days.

(21) Appl. No.: 10/174,091

(22) Filed: Jun. 18, 2002

Related U.S. Application Data
(60) Provisional application No. 60/299,120, filed on Jun. 18, 2001.

(51) Int. Cl.$^7$ ................................................ A63B 55/00
(52) U.S. Cl. ....................................... 248/96; 248/309.1
(58) Field of Search ................................ 248/96, 309.1, 248/313, 316.5, 316.1, 110, 113, 902; 211/85.7

(56) References Cited

U.S. PATENT DOCUMENTS

| | | | |
|---|---|---|---|
| 194,446 | A * | 8/1877 | Lash ........................ 248/113 |
| 316,062 | A | 4/1885 | Riessner |
| D32,373 | S | 3/1900 | Smith |
| D32,388 | S | 3/1900 | Wallace |
| D53,853 | S | 9/1919 | Kimmel |
| D58,014 | S | 5/1921 | Bradshaw et al. |
| 1,475,605 | A | 11/1923 | Smith |
| 1,555,772 | A | 9/1925 | Stripe |
| 2,007,709 | A | 7/1935 | Eppens |
| 2,017,319 | A | 10/1935 | McMullen |
| D120,628 | S | 5/1940 | Jembrzycki |
| 2,324,439 | A | 7/1943 | Thommen |
| 2,504,583 | A | 4/1950 | Rachic |
| 2,621,799 | A | 12/1952 | Wilson |
| 2,795,834 | A | 6/1957 | Szoke |
| D186,435 | S | 10/1959 | Wilson |
| D188,000 | S | 5/1960 | Shanok et al. |
| 2,945,657 | A | 7/1960 | Jarman |
| 3,285,686 | A | 11/1966 | Beaver |
| 3,319,916 | A | 5/1967 | Malicoat |
| D222,527 | S | 11/1971 | Ziaylek, Jr. |
| 3,662,979 | A | 5/1972 | Lucci |
| 3,666,221 | A | 5/1972 | Schilz |
| D237,357 | S | 10/1975 | Ziaylek, Jr. |
| 4,045,103 | A | 8/1977 | Paolino |
| D245,929 | S | 9/1977 | Montambo |
| D257,810 | S | 1/1981 | Wilson |
| D262,078 | S | 12/1981 | Newton |
| D269,156 | S | 5/1983 | Slinkard |
| 4,422,610 | A | 12/1983 | Hunt |
| 4,533,013 | A | 8/1985 | Hightower |
| D314,325 | S | 2/1991 | Ziaylek, Jr. et al. |
| 5,088,635 | A | 2/1992 | Taylor et al. |
| 5,199,581 | A | 4/1993 | Arnold |
| 5,312,037 | A | 5/1994 | Hand |
| 5,351,983 | A | 10/1994 | Descalo |
| 5,400,933 | A | 3/1995 | Murray |
| 5,405,116 | A | 4/1995 | Shepherd et al. |
| 5,551,579 | A | 9/1996 | Converse |
| D394,381 | S | 5/1998 | Ziaylek, Jr. et al. |
| 5,927,519 | A | 7/1999 | Koonts et al. |

* cited by examiner

Primary Examiner—Ramon O. Ramirez
(74) Attorney, Agent, or Firm—Maria Reichmanis

(57) ABSTRACT

A device for securing and holding an item such as a golf bag in a generally upright position, including a base adapted for attachment to a vertical surface, a reciprocable, spring-loaded head mounted to the base, and a clip pivotably attached to the base. The clip is pivotable between an open position and a closed position, and provides the user with positive feedback upon reaching either position. In the closed position, the clip and the head are capable of engaging an item such as a collar of a golf bag therebetween. The device may include one or more plaques with decorative or functional indicia.

28 Claims, 4 Drawing Sheets

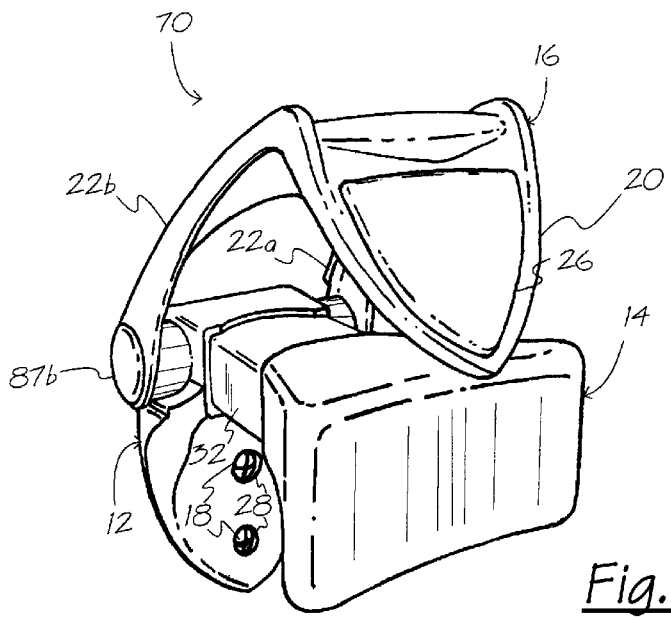
Fig. 4
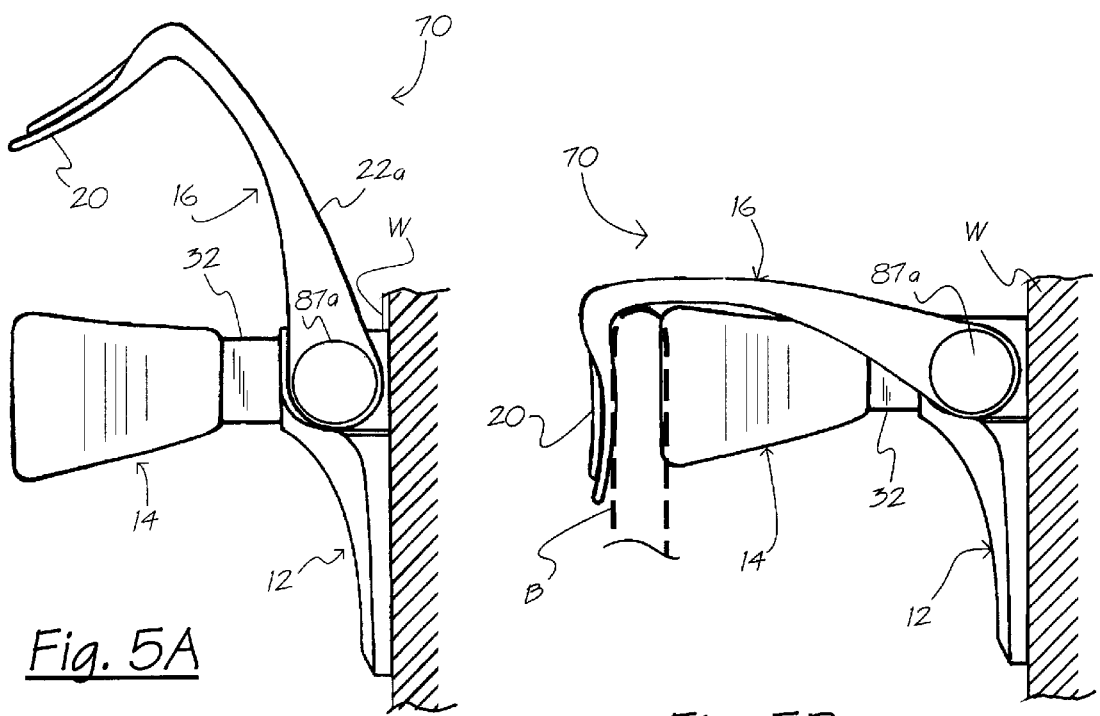
Fig. 5A
Fig. 5B

GOLF BAG RETAINING DEVICE

This application claims the benefit of U.S. Provisional Application(s) No.(s) 60/299,120 Jun. 18, 2001.

BACKGROUND OF THE INVENTION

1. Field of the Invention

The present invention relates to devices for holding golf bags. In particular, the present invention relates to a wall-mounted retaining device that can be attached to the collar of a golf bag (or like item) in order to hold the bag in a generally upright position.

2. Discussion of Background

The game of golf is becoming increasing popular. Golfers require a variety of specialized equipment: golf clubs, a golf bag for storing and carrying the clubs, golf shoes, golf balls, tees, divot tools, ball markers, etc. All of this equipment requires storage space, which is hard to come by in many present-day homes. Lacking adequate storage facilities, many golfers simply prop their golf bags against a wall where they can easily be knocked over, sometimes resulting in damage to the golf clubs and loss of small, hard-to-find objects such as tees and divot tools. Some golfers even leave their golf equipment in the trunks of their automobiles on a more-or-less permanent basis, where the contents can likewise be damaged or even stolen. This problem is also evident at golf clubs and country clubs, where golfers usually find that their storage options are limited to lockers equipped with hooks and occasionally a few clothes hangers. Lacking access to cost-effective storage and display units designed for use with golf bags, many sports equipment stores—even those specializing in golf equipment—store the bags in a generally haphazard manner.

Devices for storing and transporting golf equipment are widely available, including wheeled carriers (Stripe, U.S. Pat. No. 1,555,772; Descalo, U.S. Pat. No. 5,351,983), wall-mounted (Koonts, et al., U.S. Pat. No. 5,927,519) and free-standing storage devices (Paolino, U.S. Pat. No. 4,445,103), and storage racks which can be mounted on golf carts (Taylor, et al., U.S. Pat. No. 5,088,635).

Many golf bag stands are designed to accommodate cylindrical bags, or bags with circular necks. For example, Schilz (U.S. Pat. No. 3,666,221) discloses a golf bag stand intended for outdoor use. The stand includes a spring-loaded telescoping body with a hook at the upper end, a base at the lower end, and a reciprocable spike that can be stuck in the ground to hold the bag in an upright position. A flexible band (attached to the base) is clamped about the pan of the bag. Jarman's golf bag support has two separable parts, one secured to a golf cart and the other to a golf bag (U.S. Pat. No. 2,945,657). A spring metal loop is installed at the top of the golf bag, connected to a bracket, which can be secured to a clamp. The bottom of the bag is held by a strap. Thommen (U.S. Pat. No. 2,324,439) supports a golf bag at an angle. His device includes a plate with two clamps (made of spring steel) for gripping the collar of the bag.

Various devices for clamping the rims of other generally cylindrical items such as plant pots, baskets, and fire extinguishers are also available. For example, Lucci (U.S. Pat. No. 3,662,979) discloses a litter basket mounting and locking means having a support post with a base plate and an adjustable, lockable clamp for securing the upper rim of the basket. Beaver (U.S. Pat. No. 3,285,686) shows a basket support having a base and a clamp, both of which are secured to a cabinet door. The clamp, which is made of spring steel, has an elongated portion movable from an open position to a closed, down position. Shepherd (U.S. Pat. No. 5,405,1160, Hunt (U.S. Pat. No. 4,422,610, Rachic (U.S. Pat. No. 2,504,583), and Wilson (U.S. Des. No. 257,810) disclose plant holders with adjustable mounting brackets or clamps. McMullen (U.S. Pat. No. 2,017,319) shows a fire extinguisher bracket with an elongated rod having a base at the bottom end, and a collar and a pivotable hook at the top.

While caddies and support stands for holding golf bags are available, many of these are cumbersome or overly bulky for home use. Others simply do not hold a golf bag securely enough to prevent it from falling over, or can only be used with certain types of bags such as those having circular necks. Thus, many golfers would welcome a simple, versatile device that can effectively hold a golf bag (or like object) in an upright position.

SUMMARY OF THE INVENTION

According to its major aspects and broadly stated, the present invention is device for securing and holding an item such as a golf bag in a generally upright position. The device includes a generally vertical base adapted for attachment to a wall or other suitable surface, a spring-loaded head mounted to the base and configured for reciprocal movement in a direction approximately perpendicular thereto, and a clip pivotably attached to the base. The clip pivots between an open position, above the base, and a closed position where it overlies the base, and provides the user with positive feedback upon reaching either position. When the clip is in its closed position, the spring urges the head towards the clip to retain an object (such as the collar of a golf bag) placed therebetween securely in position. The clip, base, head, or any combination thereof, may include a detachable plaque with decorative or functional indicia.

The spring-loaded operation of the head and the clip is an important feature of the present invention. A compression spring is operably connected between the head and the base so that, when an object is placed against the head and the clip is closed, the spring urges the head towards the clip to secure the object in position. In one preferred embodiment of the invention, a second, torsion spring is connected to apply downward pressure to keep the clip from accidentally slipping up and out of position. The torsion spring also allows the user to flip the clip up, and keeps it up, while the object is being installed (or removed), and triggers the clip to automatically flip down and hold an object that is pressed against the head.

The clip is another feature of the present invention. The clip is pivotable between an open position which allows the user to place an object against the head, and a closed position where the object is held between it and the head, secured in position by the force exerted by the compression spring.

The positive feedback provided to the user is still another feature of the present invention. The clip "clicks" or "cocks" into its open or closed positions, providing some audible cue which assures the user that it has indeed reached the selected position. The user may also experience some tactile feedback if he or she is touching the clip.

The plaques constitute yet another feature of the present invention. If present, the plaques may carry decorative or functional indicia such as colors, the user's name or initials, club or tournament logos, or product trademarks.

Another feature of the present invention is its simplicity. A device according to the invention has few components, and can be manufactured cost-effectively from readily-available materials.

Still another feature of the present invention is its versatility. The device can be attached to walls, display stands, and (if desired) golf carts or other vehicles. It can be used in hallways, utility rooms, closets, hotel or motel rooms, clubhouses, locker rooms, garages, storage facilities, retail businesses, and private homes. The components of the device can be made of a wide range of materials, including but not limited to wood, metal, ceramic, plastic, and some composites and laminates. The springs are preferably made of metal; however, durable plastics or composite materials with the requisite springiness may also be useful.

Other features and advantages of the present invention will be apparent to those skilled in the art from a careful reading of the Detailed Description of Preferred Embodiments presented below and accompanied by the drawings.

BRIEF DESCRIPTION OF THE DRAWINGS

In the drawings,

FIG. 4 is a perspective view of a golf bag retaining device according to another preferred embodiment of the present invention;

FIGS. 5A and 5B are side views of the device of FIG. 4, showing the device in its open and closed positions, respectively;

DETAILED DESCRIPTION OF PREFERRED EMBODIMENTS

Figure 1A:
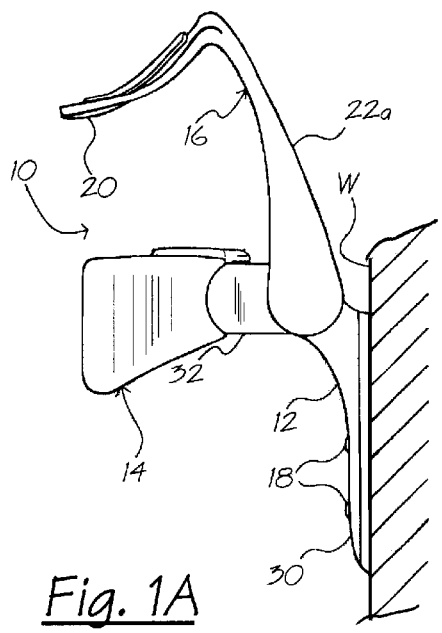
FIGS. 1A and 1B are side views of a golf bag retaining device according to a preferred embodiment of the present invention, showing the device in its open and closed positions respectively.

In the following detailed description of the invention, reference numerals are used to identify structural elements, portions of elements, surfaces or areas in the drawings, as such elements, portions, surfaces or areas may be further described or explained by the entire written specification. For consistency, whenever the same numeral is used in different drawings, it indicates the same element, portion, surface or area as when first used. Unless otherwise indicated, the drawings are intended to be read together with the specification, and are to be considered a portion of the entire written description of this invention as required by 35 U.S.C. § 112. As used herein, the terms "horizontal," "vertical," "left," right," "up," "down," "distal," and "proximal," as well as adjectival and adverbial derivatives thereof, refer to the relative orientation of the illustrated structure as the particular drawing figure faces the reader.

Figure 1B:
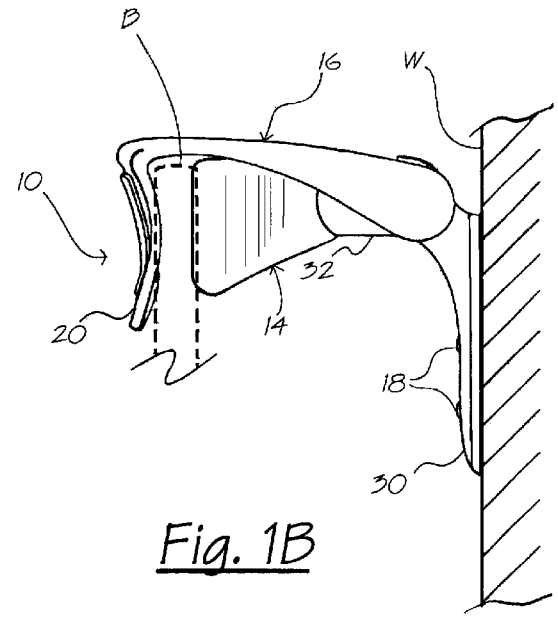

Referring now to FIGS. 1A and 1B, 2, and 3, there is shown a golf bag retaining device 10 according to a preferred embodiment of the present invention. Device 10 includes a mounting plate or base 12, a spring-loaded head 14 operably connected to the base, and a clip 16 pivotable between a first, open position above the head (FIG. 1A) and a second, closed position near the head (FIG. 1B). Base 12 is attached to a wall W or other support structure by screws, sheetrock screws, hollow wall anchors, nails, or other suitable fasteners 18 installed in throughholes 28. Alternatively, base 12 may be attached to an adapter in the case of a height adjustable mount, hung on any suitable type of hook, or secured to wall W by an adhesive.

Clip 16 and head 14 form a clamp that, in its closed position, securely holds the collar of a golf bag B between them, thereby holding the bag in a generally upright position as indicated in FIG. 1B. A typical golf bag such as bag B has a long, narrow body with a collar (also known as a "neck" or "rim") at the open end and a reinforcing pan at the lower end. The body of bag B may be made of a sturdy material such as canvas or rip-stop nylon, leather, or plastic sheeting. Most golf bags also have shoulder straps or handles, and interior or exterior pockets for storing golf balls or other accessories. Since these types of bags are narrow compared to their length, they are easy to dislodge when simply propped up against a wall. Maintaining bag B in an upright position, therefore, greatly reduces the chances that it will topple and its contents be spilled.

Clip 16 has a downwardly-extending member 20 with a pair of spaced-apart arms 22a, 22b having proximal ends pivoted to base 12. Arms 22a, 22b may be retained by internal or external connectors. When clip 16 is in the closed position, member 20 is opposed to head 14 and spaced apart from the head (FIG. 1B); when clip 16 is in the open position, it overlies the head (FIG. 1A). The distal ends of arms 22a, 22b may be connected to member 20 by any suitable fasteners or adhesives; alternatively, the arms may be integrally formed with member 20. Head 14 and member 20 may be complementary in shape. For example, the inner surface of member 20 may be shaped to approximately conform to the outer surface of head 14.

Figure 2:
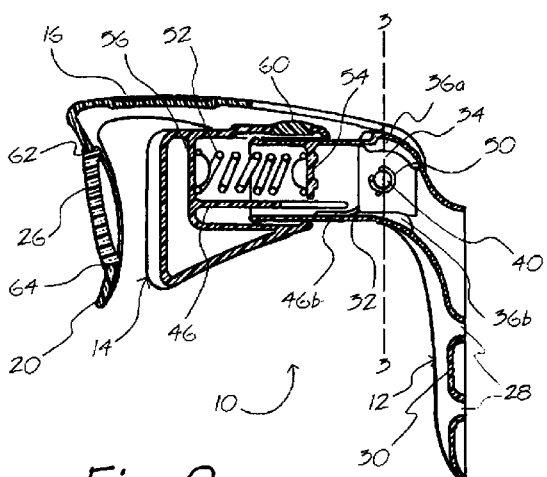
FIG. 2 is a longitudinal cross-sectional view of the device of FIG. 1B.

Member 20 may carry a first plaque 26 with a decorative logo or other indicia (FIG. 2). Plaque 26 may be a snap-in or press-fitted device mated to any suitable type of retainer attached to (or integrally formed with) member 20; alternatively, the plaque may be attached with an adhesive. If desired, plaque 26 may be formed by printing, engraving, embossing, or molding the selected decorative or functional indicia on member 20.

Figure 3:
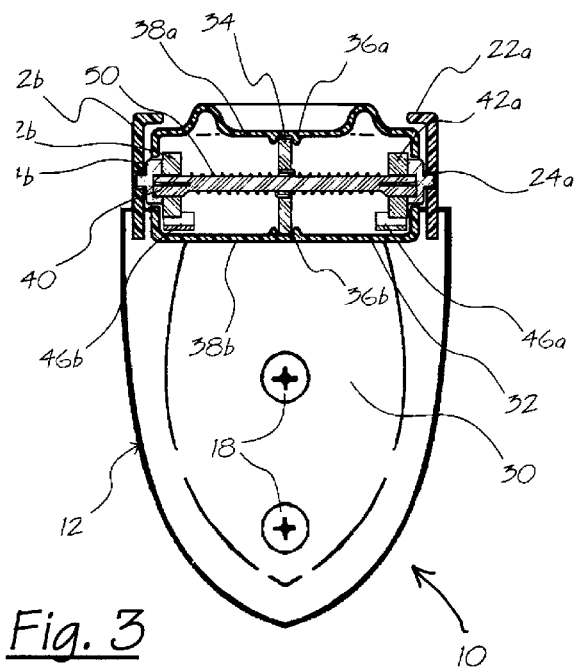
FIG. 3 is a front view of the device of FIG. 1B, showing the spring assembly and the arm link in cross-section through the line 3—3 of FIG. 2.

Base 12 has a lower portion 30 with an approximately perpendicular, outwardly-extending upper portion 32; head 14 is reciprocable or slidable on upper portion 32 (FIGS. 2 and 3). A bracket 34 is positioned in channels 36a, 36b formed between pairs of walls 38a, 38b. Bracket 34 supports an axle 40 with a pair of resistance blocks 42a, 42b, to which ends 22a, 22b of clip 16 are pivoted by any suitable types of connectors. A pair of strips 46a, 46b, preferably of spring metal, are connected generally as shown. Resistance blocks 42a, 42b and strips 46a, 46b work together so that, when clip 16 is raised to the "up" or open position of FIG. 1A, the clip stays in that position. Then, when bag B is pushed inwards against head 14, clip 16 is triggered to automatically flip down (to the position shown in FIG. 1B) and hold the bag.

A pair of torsion springs 50 is installed on axle 40, and a compression spring 52 is installed between head 14 and recessed walls 54, 56 formed in portion 32 and head 14, respectively (FIG. 2). Torsion springs 50 apply downward pressure on the collar of bag B, keeping clip 16 from accidentally slipping up and out of position when the clip is closed. Compression spring 52 is preferably installed in a fully or partly relaxed state so that the spring is compressed when the collar of bag B is pressed against head 14. When clip 16 is then pivoted to the closed position of FIG. 1B, the compressed spring 52 urges head 14 towards clip 16 to secure the collar of bag B therebetween. Spring-loaded clip 16 also exerts a downward force to help secure bag B in position.

In use, clip 16 is pivoted to the open position shown in FIG. 1A. As clip 16 nears the open position, torsion springs 50 operate to "click" or "cock" the clip into the open position, providing some audible and tactile feedback to the user which indicates when the clip seats in the open position. Clip 16 then remains in the open position until the user compresses spring 52 by pushing head 14 inwards in the direction indicated by arrow A.

The user then places the collar of golf bag B against head 14, and gently pushes the head inwards, compressing spring 52. As head 14 moves inwards, clip 16 automatically pivots downwards to the closed position shown in FIG. 1B, securing the collar of bag B between the head and the clip. When clip 16 reaches the closed position, the user again perceives a degree of audible feedback as the clip clicks or cocks into the closed position. In addition, there may be some tactile feedback if the user is touching the clip or the bag when the clip reaches the closed position. Compressed spring 52 urges head 14 to clip 16 to retain the collar therebetween.

A second plaque 60 may be installed on head 14 as shown in FIG. 2. Plaques 26 and 60, if present, may carry decorative or informational indicia such as decorative designs, colors, the user's name or initials, numbers, product brand names or trademarks, golf club logos or tournament logos. Plaques 26 and 60 may be formed with circumferential grooves 62 which snap onto corresponding projections 64 formed in clip 16 and head 14, respectively. Other types of fasteners may be used if desired. Plaques 26 and 60 are preferably easy to remove and replace so that the user can install a selected plaque or plaques on device 10; however, permanently-installed plaques may also be useful. Alternatively, plaques 26 and 60 may be attached by adhesives, or formed by applying decorations or informational indicia to device 10 by printing, engraving, embossing, molding, or other suitable techniques.

In another embodiment of the invention, torsion springs 50 and associated components (bracket 34, axle 40, resistance blocks 42a, 42b, strips 46a, 46b) may be omitted. Ends 22a, 22b of clip 16 may then be attached to the opposing ends of portion 32 by any suitable types of connectors. Alternatively, resistance blocks 42a, 42b, strips 46a, 46b, and torsion springs 50 may be omitted, and ends 22a, 22b pivotably attached to axle 40 as shown in FIG. 3. Bracket 34, if present, provides structural support for the resulting configuration.

The various parts of device 10 are made of any suitable materials, including wood, metal, plastic, ceramics, laminates, composite materials, or combinations thereof. In a particularly preferred embodiment, base 12, head 14, and clip 16 are made of molded plastic. Hollow-walled construction with suitable interior reinforcement (such as is provided by wall 56 in head 14) helps ensure structural strength, light weight, and cost-effective use of materials.

Bracket 34, resistance blocks 42a, 42b, axle 40, and springs 50 and 52 are preferably made of metal; however, other materials such as composites and engineering plastics may also be useful. Plaques 26 and 60 may be made of any suitable materials, including plastic, metal, and paper.

A golf bag retaining device 70 according to another preferred embodiment of the present invention is shown in FIGS. 4–9. Like above-described device 10, device 70 includes a mounting plate or base 12, a spring-loaded head 14 operably connected to the base, and a clip 16 pivotable between a first, open position (FIG. 5A) and a second, closed position (FIG. 5B). Clip 16 has a downwardly-extending member 20 and a pair of spaced-apart arms 22a, 22b connected to an axle 40, as will be described further below. Member 20, base 12, and/or head 14 may carry a plaque with decorative or functional indicia as described above (a plaque 26 is shown schematically in FIG. 4).

Figure 6:
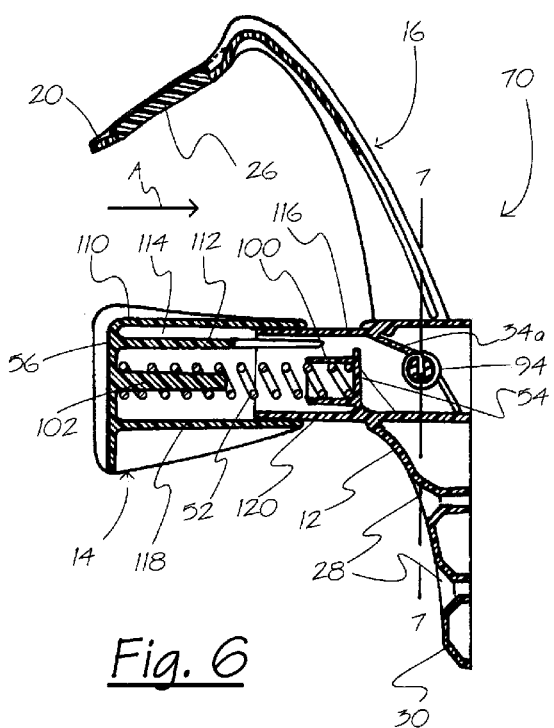
FIG. 6 is a longitudinal cross-sectional view of the device of FIG. 4, showing the device in an open position.
Figure 7:
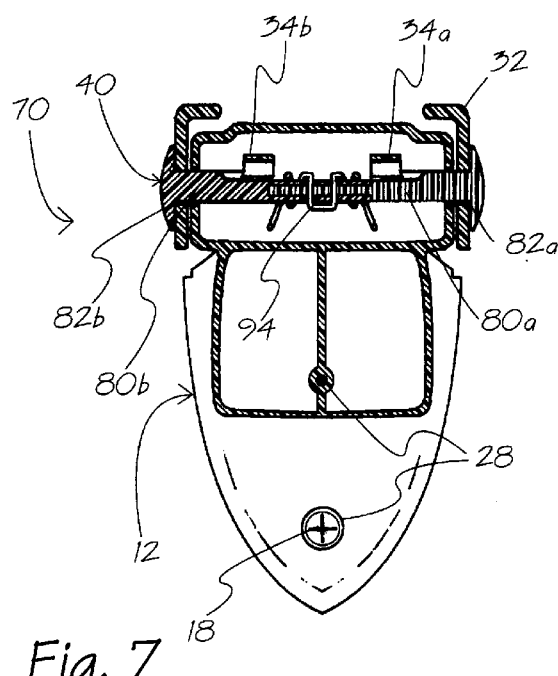
FIG. 7 is a front view of the device of FIG. 4, showing the spring assembly and the arm linkage in cross-section through the line 7—7 of FIG. 6.

Base 12 has a lower portion 30 with an approximately perpendicular, outwardly-extending upper portion 32 and a pair of interior flanges 34a, 34b (FIGS. 6 and 7). A pair of throughholes 28 are used to mount base 12 to a wall or other support with screws (such as screws 18), nails, or other fasteners. Alternatively, base 12 may be attached with a suitable adhesive.

Figure 8:
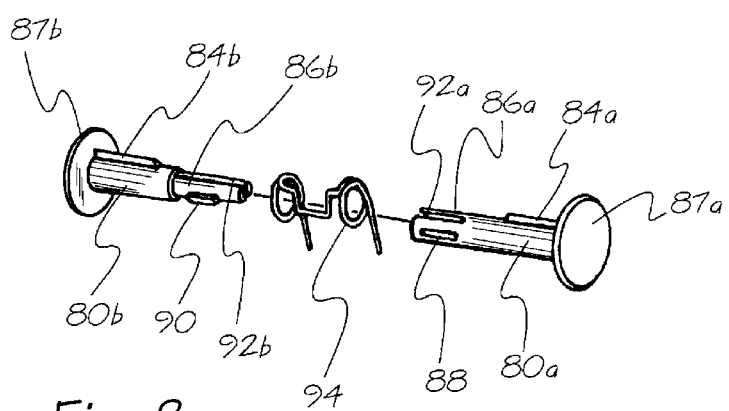
FIG. 8 is an exploded view of the axle and the torsion spring assembly of the device of FIG. 4.

Axle 40 has two complementary sections 80a and 80b fitted in throughholes 82a, 82b, respectively of portion 32 (FIGS. 7 and 8). Projections 84a, 84b act as ratchet stops to flanges 34a, 34b; caps 87a, 87b help retain sections 80a, 80b in position. Flanges 34a, 34b may be separate structures; alternatively, flanges 34a, 34b may be spaced-apart projections on a suitable base structure. An end 86a of section 80a has throughholes 88 formed therein, and an end 86b of section 80b has corresponding projections 90. Sections 80a and 80b snap together to form axle 40, with projections 90 installed in throughholes 88. Slots 92a, 92b capture the tabs of a torsion spring 94 installed on axle 40.

A compression spring 52 is installed between a recess 100 formed in a suitable structure 54 in portion 32 of base 12, and a support 102 extending from a wall 56 in head 14 (FIG. 6). Walls 110, 112 define a channel 114 dimensioned for receiving an upper wall 116 of portion 32; wall 118 is positioned against a lower wall 120 of portion 32 generally as shown. Compression spring 52 is preferably installed in a fully or partly relaxed state.

To hold a golf bag with device 70, the user pivots clip 16 to the open position shown in FIG. 5A. When clip 16 nears the open position, it clicks or cocks into that position by the action of torsion spring 94. This feature provides a degree of audible and tactile feedback to the user which indicates that the clip is indeed seated in the open position. Clip 16 then remains in the open position until the user compresses spring 52 by pushing head 14 inwards in the direction indicated by arrow A.

The user then places the collar of golf bag B against head 14, and gently presses the head inwards, compressing spring 52. As head 14 moves inwards, clip 16 automatically pivots downwards to the closed position shown in FIG. 5B, securing the collar of bag B between the head and the clip. When clip 16 reaches the closed position, the user again perceives a degree of audible and tactile feedback as the clip clicks (cocks, seats) into the closed position. Compressed spring 52 urges head 14 to clip 16 to retain the collar therebetween; torsion spring 94 also exerts some downward force to help keep clip 16 from accidentally slipping up and out of position.

Figure 9:
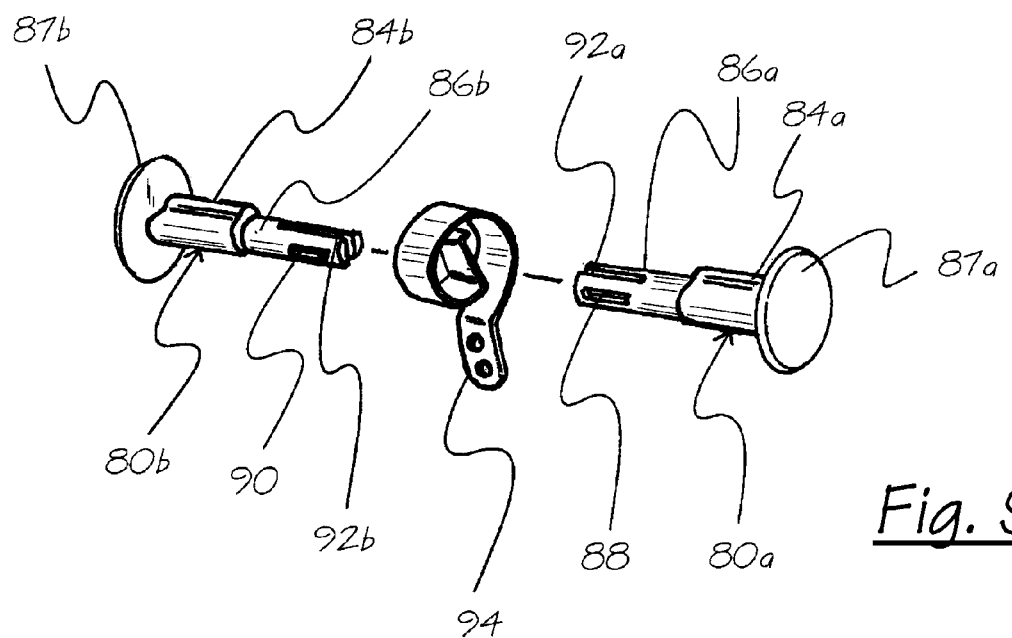
FIG. 9 is an exploded view of another embodiment of the axle and the torsion spring assembly.

Additional types of torsion springs may be used with the invention, for example, a flat torsion spring 94 having the general configuration shown in FIG. 9. Here, outer portions 96b, 96b of sections 80a and 80b have cross-sections of any convenient shape; the other components of axle 40 are the same as those described above for the embodiment of FIG.

8. A torsion spring 94 as shown in FIG. 9 permits manual override of the above-described automatic seating of clip 16 into its open or closed positions. This type of torsion spring also reduces the possibility of clip 16 slamming into either position.

Devices 10 and 70 can be attached to walls, display stands, and golf carts and other vehicles, for inside or outside use. The devices can be used in hallways, utility rooms, hotel or motel rooms, clubhouses, locker rooms, garages, storage facilities, retail stores, and homes. The dimensions of devices 10 and 70 can vary widely. For example, a device 10 (or 70) useful for holding typical golf bags has a head 14 and clip 16 that are approximately ⅜"–⅝" (about 1.0–1.6 cm) apart in the closed position. Device 10 (or 70) is typically mounted approximately 30"–40" (about 76–102 cm) from the floor so as to allow a typical golf bag to stand upright in a vertical position.

Figure 10:
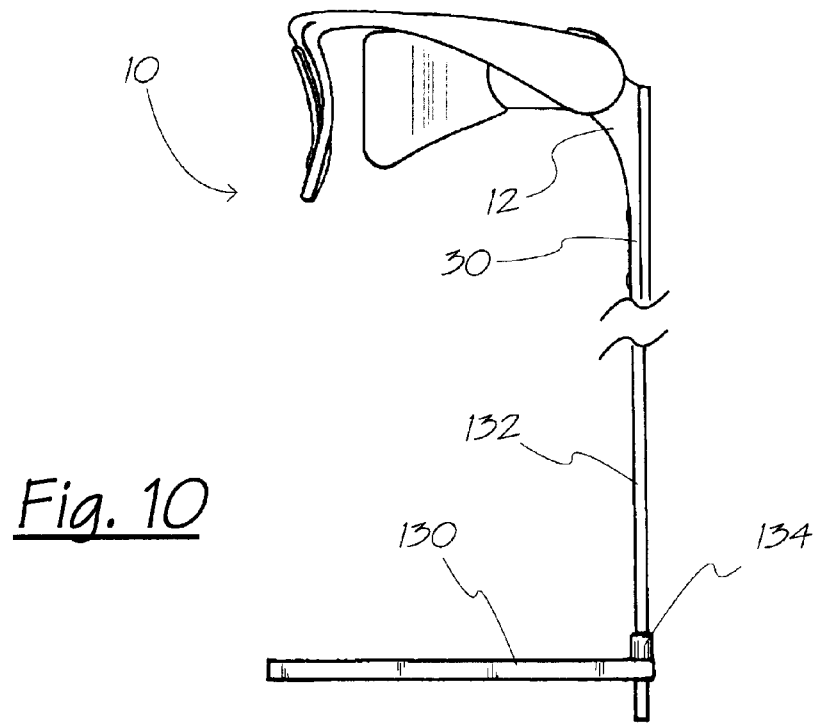
FIG. 10 is a side view of the device with an auxiliary support for the bottom of a golf bag or similar object.

A device according to the present invention may include an auxiliary support 130 for the bottom of a golf bag (FIG. 10). Support 130 can be a separate entity or may be attached to a rod 132 which in turn is attached to portion 130 of base 12. Alternatively, support 130 may be attached to, or be integrally formed with, a suitably elongated portion 30 of base 12. If desired, a suitable mechanism (indicated schematically as 134) may be used to adjust the distance between support 130 and device 10, that is, the vertical position of support 130 on rod 132.

Since the action of compression spring 52 and torsion springs 50, 94 is independent of their orientation, a device according to the present invention can be installed in any convenient orientation: upright with clip 16 closing downwards, rotated by 180° so that clip 16 closes upwards, or sideways. The orientation shown in the FIGS. is generally preferred for use with golf bags: when a golf bag is stored in an approximately upright, vertical position, the contents are much less likely to spill onto the floor than when the bag is tilted. However, other orientations may be useful for use with different items.

A device according to the invention is simple and attractive, compact, and versatile. Not only can device 10 (or a device 70) be used to secure the collar of a golf bag or like item, but it can also be used for holding clothing and other items that can be grasped between head 14 and clip 16. If desired, the device may incorporate a locking mechanism to deter accidental removal (or unauthorized use) of golf bags or other objects secured thereto. The device holds a golf bag (or other item) a little away from the wall to help minimize scuffing. Plaques 26 and 60, if present, personalize the device for an individual or an institution such as a golf course.

With respect to the above description of the invention, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, it will be apparent to those skilled in the art that many changes and substitutions can be made to the preferred embodiment herein described without departing from the spirit and scope of the present invention as defined by the appended claims.

What is claimed is:

1. A device for holding an item, said device comprising:
   a base;
   a head;
   compression spring means coupling said head to said base, said compression spring means urging said head outwards from said base; and
   a clip pivotably connected to said base, said clip having an open position above said head and a closed position near said head so that, when said head is pushed inwards towards said base and said clip is pivoted from said open position to said closed position, said compression spring means urges said head towards said clip to retain an item placed against said head therebetween.

2. The device as recited in claim 1, further comprising an axle pivoted to said base, said clip operably connected to said axle.

3. The device as recited in claim 1, wherein said clip further comprise:
   a pair of spaced-apart arms having distal ends and proximal ends, said proximal ends pivotably connected to said base; and
   a member connecting said distal ends, said member being opposed to said head when said clip is in said closed position.

4. The device as recited in claim 1, further comprising an axle pivoted to said base, wherein said clip further comprises:
   a pair of spaced-apart arms having distal ends and proximal ends, said proximal ends operably connected to said axle; and
   a member connecting said distal ends, said member being opposed to said head when said clip is in said closed position.

5. The device as recited in claim 1, wherein said base further comprises
   a first portion; and
   a second portion approximately perpendicular to said first portion, wherein said compression spring means couples said head to said second portion.

6. The device as recited in claim 1, further comprising means for carrying informational indicia, said indicia-carrying means attached to at least one of said base, said head, and said clip.

7. The device as recited in claim 1, wherein said compression spring means further comprise a metal compression spring.

8. The device as recited in claim 1, wherein at least one of said base, said head, and said clip are made of wood, plastic, metal, ceramic, composite materials, laminates, or combinations thereof.

9. A device for holding an item, said device comprising:
   a base;
   a head reciprocable on said base;
   compression spring means operably connected between said head and said base, said compression spring means urging said head outwards from said base; and
   clip means operably connected to said base, said clip means having an open position above said head and a closed position opposed to said head so that, when said head is pushed inwards towards said base and said clip means is moved from said open position to said closed position, said compression spring means urges said head towards said clip means to retain an item placed against said head therebetween.

10. The device as recited in claim 9, further comprising torsion spring means operably connected to said clip means, said torsion spring means urging said clip means towards said closed position when said compression spring means is compressed.

11. The device as recited in claim 9, further comprising torsion spring means operably connected to said clip means, said torsion spring means urging said clip means towards said open position when said compression spring means is released.

12. The device as recited in claim 9, wherein said clip means further comprises a clip pivotably connected to said base, and wherein said device further comprises torsion spring means operably connected to said clip, said torsion spring means urging said clip to click into said closed position when said clip is pivoted to near said closed position.

13. The device as recited in claim 9, wherein said clip means further comprises a clip pivotably connected to said base, and wherein said device further comprises torsion spring means operably connected to said clip, said torsion spring means urging said clip to click into said open position when said clip is pivoted to near said open position.

14. The device as recited in claim 9, further comprising an axle pivoted to said base, and wherein said clip means further comprises a clip operably connected to said axle.

15. The device as recited in claim 9, wherein said clip means further comprises a clip and wherein said device further comprises:

an axle pivoted to said base, said clip operably connected to said axle; and torsion spring means operably connected to said axle, said torsion spring means urging said clip towards said closed position when said compression spring means is compressed and towards said open position when said compression spring means is released.

16. The device as recited in claim 9, wherein said clip means further comprises a clip, and wherein said device further comprises:

an axle pivoted to said base, said clip operably connected to said axle; and torsion spring means operably connected to said axle, said torsion spring means urging said clip towards said closed position when said compression spring means is compressed and towards said open position when said compression spring means is released.

17. A device for holding an item, said device comprising:

a base;

a head reciprocable with respect to said base;

a compression spring operably connected between said head and said base, said compression spring urging said head outwards from said base;

a clip pivotably connected to said base, said clip having an open position above said head and a closed position opposing said head; and a torsion spring operably connected to said clip so that, when said head is pushed inwards towards said base, said torsion spring urges said clip towards said closed position, said compression spring means urging said head outwards towards said clip to retain an item placed against said head therebetween, said torsion spring urging said clip towards said open position when said clip is pivoted away from said closed position.

18. The device as recited in claim 17, wherein said torsion spring is configured for urging said clip to click into said open position when said clip is pivoted to near said open position.

19. The device as recited in claim 17, wherein said torsion spring is configured for urging said clip to click into said closed position when said clip is pivoted to near said closed position.

20. The device as recited in claim 17, further comprising an axle pivoted to said base, wherein said clip is operably connected to said axle.

21. The device as recited in claim 17, wherein said clip further comprises:

a pair of spaced-apart arms having distal ends and proximal ends, said proximal ends pivotably connected to said base; and a member connecting said distal ends, said member being opposed to said head when said clip is in said closed position.

22. The device as recited in claim 17, further comprising an axle pivoted to said base, wherein said clip further comprises:

a pair of spaced-apart arms having distal ends and proximal ends, said proximal ends operably connected to said axle; and a member connecting said distal ends, said member being opposed to said head when said clip is in said closed position.

23. The device as recited in claim 17, wherein said base further comprises a first portion; and a second portion approximately perpendicular to said first portion, wherein said head is slidable on said second portion and said compression spring couples said head to said second portion.

24. The device as recited in claim 17, further comprising means for carrying informational indicia, said indicia-carrying means attached to said device.

25. The device as recited in claim 17, wherein at least one of said base, said head, and said clip are made of wood, plastic, metal, ceramic, composite materials, laminates, or combinations thereof.

26. The device as recited in claim 17, wherein at least one of said compression spring and said torsion spring is made of metal.

27. The device as recited in claim 17, further comprising a support operably connected to said base, said support spaced apart from said clip and positioned for supporting a bottom of said object.

28. The device as recited in claim 17, further comprising:

a support operably connected to said base, said support spaced apart from said clip and positioned for supporting a bottom of said object; and means for adjusting a distance between said clip and said support.

\* \* \* \* \*